United States Patent [19]
Chamberland

[11] Patent Number: 5,931,654
[45] Date of Patent: Aug. 3, 1999

[54] RECESSED FURNACE LANCE PURGE GAS SYSTEM

[75] Inventor: Ray Paul Chamberland, Sandy Hook, Conn.

[73] Assignee: Praxair Technology, Inc., Danbury, Conn.

[21] Appl. No.: 08/885,765

[22] Filed: Jun. 30, 1997

[51] Int. Cl.⁶ .................................................. F23C 5/00
[52] U.S. Cl. ........................... 431/8; 431/10; 431/187; 239/424; 239/132.5; 239/105
[58] Field of Search .................. 431/2, 8, 9, 10, 431/186, 187; 60/39.06, 39.27; 239/105, 113, 132, 132.3, 132.5, 419, 424.5, 424

[56] References Cited

U.S. PATENT DOCUMENTS

| | | | |
|---|---|---|---|
| 2,458,543 | 1/1949 | Urquhart | 431/10 |
| 2,886,014 | 5/1959 | Konrad et al. | 239/132 |
| 3,224,749 | 12/1965 | Berry | 239/132 |
| 3,255,802 | 6/1966 | Browning | 431/9 |
| 5,209,656 | 5/1993 | Kobayashi et al. | 431/187 |
| 5,256,058 | 10/1993 | Slavejkov et al. | 431/8 |
| 5,266,025 | 11/1993 | Francis, Jr. et al. | 431/187 |
| 5,295,816 | 3/1994 | Kobayashi et al. | 431/9 |
| 5,458,483 | 10/1995 | Taylor | 431/350 |
| 5,580,237 | 12/1996 | Leger | 431/8 |
| 5,620,316 | 4/1997 | Duboudin et al. | 431/187 |
| 5,700,143 | 12/1997 | Irwin et al. | 431/8 |
| 5,725,367 | 3/1998 | Joshi et al. | 431/8 |
| 5,743,723 | 4/1998 | Iatrides et al. | 431/8 |

Primary Examiner—Ira S. Lazarus
Assistant Examiner—Josiah C. Cocks
Attorney, Agent, or Firm—Stanley Ktorides

[57] ABSTRACT

A system and method for protecting a nozzle that injects a high velocity main gas into a furnace or combustion zone. The nozzle is located in a passage recessed from the exit port opening of the passage which communicates with the combustion zone. Purge gas is passed into the passage upstream of the nozzle. The volume of the purge gas exceeds 50% of the total volume of the main gas and purge gas and the purge gas has a velocity of at least 100 ft/sec thereby preventing furnace gases from entering the passage and attacking the nozzle.

9 Claims, 4 Drawing Sheets

■ Expt'l
— Turbulent 5,931,654

RECESSED FURNACE LANCE PURGE GAS SYSTEM

TECHNICAL FIELD

This invention relates to the injection of high velocity gas into the atmosphere of a furnace combustion zone.

BACKGROUND OF THE INVENTION

Advances in combustion technology have employed high velocity gas injection, typically by an oxygen lance, into a furnace combustion zone to carry out combustion with reduced generation of nitrogen oxides ($NO_x$). The injection of the gas at high velocity causes furnace gases to be aspirated or entrained into the injected high velocity gas stream and this reduces $NO_x$ generation.

Nozzles with relatively small diameters are usually employed to achieve the high velocity for the injected gas. One problem encountered with high velocity gas injection into a combustion zone is that the furnace gases, which may comprise particulate matter and condensable vapors, cause the lance nozzles, which typically have small openings, to foul or corrode easily as the furnace gases are aspirated or entrained into the high velocity gas exiting the lance nozzle. The furnace gases are quite hot, on the order of 2,000° F. to 3,000° F., and this exacerbates the nozzle fouling and corrosion problem.

One attempt to solve the nozzle problem involves using a large amount of water to cool the nozzle so as to prevent high temperature corrosion or nozzle melting. This approach has problems in that it is relatively complex to implement and operate. It also can escalate the nozzle corrosion and fouling problems when the furnace atmosphere contains condensable vapors. Another approach has been to use ceramic nozzles. However, ceramic nozzles, when used in highly condensable and high corrosive furnace atmospheres, become fouled and the ceramic is eroded away. For example, in an application in which a ceramic single hole nozzle was used in a borosilicate fiberglass furnace, the experience was that the nozzles had to be replaced once a week. An acceptable nozzle replacement rate should be no more than once every six months.

U.S. Pat. No. 5,295,816, made progress in solving the problem by using a low velocity protective gas surrounding the nozzle. The protective gas, which can be oxygen (used with an oxygen lance), preferably comprises 10 to 30% of the total gas flow, and has a low velocity preferably 10 to 50 ft/sec around the main gas jet so as to be entrained into the main gas jet. While this system provides some protection for a metallic nozzle, it does not completely solve the problem of nozzle corrosion because furnace gases are drawn into the cavity and entrained into the high velocity main gas. Another approach to reducing the corrosion is to reduce the velocity of the main gas from the lance. But this results in higher $NO_x$ emissions from the burner with minimal effect on lance maintenance. A further approach is to cast, or core-drill, a hole in the burner block and use the hole as a nozzle to introduce staged oxygen into the furnace. Implementation of this approach results in increased maintenance of the furnace since the oxygen from the hole cools the entrance to the furnace wall passage in which the lance is located. It also causes nozzle corrosion and formation of tubes of condensables. In addition, this approach creates inflexibility because it does not permit the lance oxygen velocity to be changed for the same flow rate.

The aforesaid problems become particularly acute in certain applications, such as an enamel frit glass furnace, where it is desired to reduce $NO_x$ emissions. Here the furnace flue gas atmosphere is highly corrosive and contains more condensables than found, for example, in a typical soda lime glass furnace. Prior experience with borosilicate glass furnaces, which have fewer corrosives and condensibles in the flue gas atmosphere than enamel frit furnaces, but more than a soda lime glass furnace, resulted in high wear and maintenance for an oxygen lance ceramic/stainless steel composite nozzle. This was so even when using protective gas techniques such as described in the aforesaid U.S. Pat. No. 5,295,816.

BRIEF DESCRIPTION OF THE INVENTION

The present invention relates to a system and method for injecting a high velocity main gas, such as oxygen, from a nozzle into the combustion zone of a furnace in a manner such that the nozzle is protected against corrosion and condensibles from the furnace gas. In accordance with the invention, the furnace wall has a passage in which a lance is located. The exit port of the passage into the furnace combustion zone is of a diameter D and the lance nozzle is spaced inwardly of the exit port by a distance L. An annular conduit for a purge gas surrounds the lance and has an exit in the passage that is upstream of the nozzle. The volume of the purge gas exceeds 50% of the total volume of the main gas and purge gas and has a velocity greater than 100 ft/sec. The high velocity, high volume flow of the purge gas prevents the furnace gas from entering the passage to attack the nozzle, and also prevents the formation of condensibles at the passage exit port.

It is therefore an object of the invention to provide a method that permits the injection of a main gas at a high velocity into a furnace combustion zone while protecting the main gas nozzle from degradation by the corrosive atmosphere of the combustion zone.

Another object is to provide a lance assembly for a furnace to inject a main gas at a high velocity into the furnace in which a purge gas protects the lance nozzle from being attacked by the furnace atmosphere.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
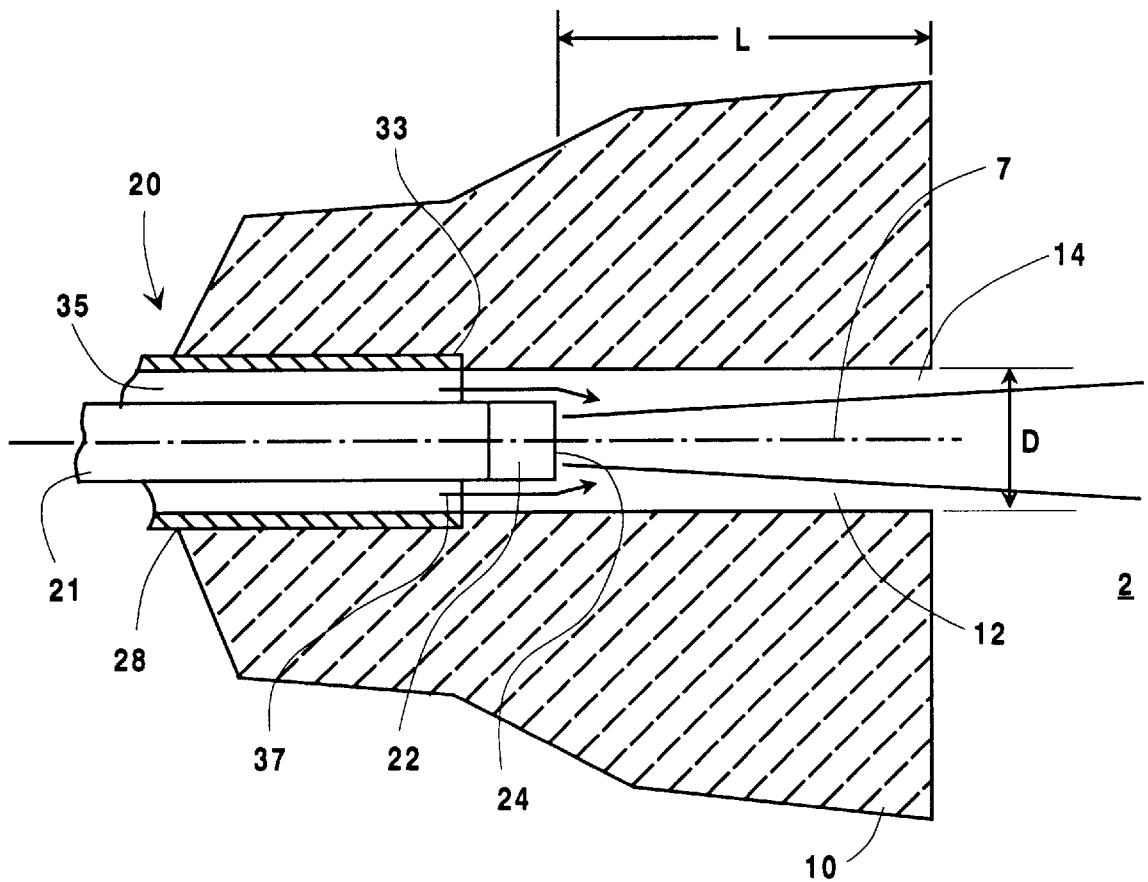
FIG. 1 is a schematic view of a recessed furnace lance purge gas system assembly in accordance with the invention.

FIG. 1 shows a portion 10 of a wall of the furnace which can be of any suitable refractory material. Refractory wall 10 borders a combustion zone 2 of a furnace wherein there is contained a furnace atmosphere comprising furnace gases such as, for example, carbon dioxide, water vapor, nitrogen and/or oxygen. The furnace atmosphere may also contain particulate matter, such as glass batch materials or ash from coal combustion, glass frit and/or condensable vapors such as sodium species or acid vapors. The furnace atmosphere is generally at an elevated temperature typically exceeding 1000° F. and usually within the range of from 1500° F. to 3000° F.

The wall 10 includes a through passage 12 having an exit port opening 14 into the furnace interior to communicate with the combustion zone 2. The exit port opening 14 has a diameter D. Mounted within the passage 12 is a lance 20 that has a main gas supply conduit 21 to which is connected a nozzle 22 with an exit end 24. Lance 20 is for the supply of the main gas, such as oxidant or fuel. Supply conduit 21 is connected by conduit means (not shown) to a source of oxidant or fuel. The nozzle 22 can be of a suitable material, such as ceramic or metal, of a type that can best withstand the high temperature from heat radiation in the combustion zone. The nozzle exit end 24 has an inner diameter $d_{ID}$ and an outer diameter $d_{OD}$.

The exit end 24 of nozzle 22 is recessed from exit port opening 14 by a distance L. The distance L is typically from 2 to 4 inches. The main gas jet from nozzle 22 expands, as shown at 7, but preferably does not contact the wall of passage 12. Preferably, nozzle exit end 24 is recessed from opening 14 by a distance such that L/D is not more than 3, and preferably is within the range of 0.5 to 3.0. The recess L of nozzle exit end 24 is sufficient to protect the nozzle from thermal damage due to the conditions within combustion zone 2 while not being so great as to cause the jet of main gas exiting from nozzle 22 to expand into the walls of passage 12 prior to entering into combustion zone 2. This would eliminate the aspiration or entraining effect required by the invention.

The injection orifice of nozzle 22 has a small diameter, generally less than 0.5 times the diameter D of exit port opening 14 of passage 12 and usually within the range of from 0.05 to 0.5 times the diameter D of opening 14. In this way, the main gas is injected out of nozzle 22 at a high velocity. The preferred high velocity exceeds 200 ft/sec and preferably is within the range of from 200 to 2000 ft/sec.

The main gas supplied from nozzle 22 may be either fuel or oxidant. A fuel may be any gas which contains combustibles which may combust in the combustion zone. Among such fuels can be, for example, natural gas, coke oven gas, propane, hydrogen and methane. The oxidant may be any suitable oxidant such as air, oxygen-enriched air or technically pure oxygen having an oxygen concentration of at least 99.5%. The main gas from nozzle 24 passes into combustion zone 2 wherein it mixes with furnace gases and combusts further downstream with either fuel or oxidant, as the case may be, to produce further furnace gases.

The high velocity of the main gas jet causes furnace gases from the combustion zone to aspirate or entrain into the main gas jet. This has a beneficial effect on $NO_x$ generation by providing added non-reactive mass thus reducing the peak flame temperature. The high velocity of the main gas jet would also cause furnace gases to enter passage 12. It is believed that such furnace gases are responsible for the nozzle corrosion problem.

Surrounding the lance nozzle 22 is a purge gas conduit of annular shape 28 with an exit end 37 that terminates in a seat 33 in the furnace wall passage 12. The conduit 28 defines a passage 35 for purge gas that surrounds the main gas nozzle 22. The exit end 37 of conduit 28 is further recessed in passage 12 than is the nozzle exit end 24. That is, it is upstream of the nozzle exit end. The purge gas from conduit 28 passes around the exit end 24 of the main gas nozzle 22 and exits through port opening 14 into the combustion zone 2. The total combined gas flow of main gas and purge gas is discharged through opening 14 into the combustion zone 2.

The purge gas has a composition substantially the same as that of the main gas. The velocity of the purge gas is relatively high, exceeding 100 ft/sec and generally up to 200 ft/sec, but is generally less than the velocity of the main gas. By maintaining the compositions of the main and purge gases substantially the same, combustion near the nozzle 22 within passage 12 is substantially prevented. The relatively high velocity of the purge gas relative to the velocity of the main gas helps to reduce the amount of purge gas required for a given main gas flow rate, nozzle inner diameter, and nozzle recess to block the furnace gas from entering the passage 12 and reacting with the nozzle 22. The purge gas flows around and past the nozzle end 24 and some of the purge gas is then entrained into the main gas within cavity 12 thereby also serving to increase the momentum-averaged velocity of the combined gas flow. Higher momentum-averaged velocity for combined gas flow serves to reduce production of $NO_x$. Some of the purge gas is not entrained into the main gas jet due to the high velocity of the purge gas and this non-entrained purge gas forms a protective coaxial boundary layer around the main gas jet within cavity 12.

It is an important element of this invention that the purge gas be injected into the passage 12 at a point further recessed from the opening 14 than the point where the main gas is injected into the passage. This further recess accomplishes two results. First, it allows the purge gas to flow around the outer surface of the nozzle 22, thus serving to protect the nozzle from any hot furnace gases drawn into the passage. Second, the further recess of the purge gas conduit protects the annular exit opening 37 from becoming fouled due to the action of the furnace gases. The further recess must be sufficient to enable an even, or uniform, distribution of the purge gas around the nozzle 22. A typical recess of the exit opening 37 of the purge gas conduit from the exit end 24 of nozzle 22 is 1 to 2 inches.

The purge gas is injected into passage 12 at a flow-rate such that the purge gas flow is within the range of from greater than 50 to about 80%, preferably from 52 to 77%, of the total gas flow, i.e., purge gas and main gas, injected into passage 12. This high flow rate, or large amount, of purge gas maintains furnace gases outside cavity 12 enabling the accomplishment of the nozzle protection effect.

The purge gas flows around the surface of and past nozzle 22. Downstream of nozzle 22 some of the purge gas is entrained into the main gas jet and serves as a gas barrier preventing furnace gases from contacting nozzle 22. The main gas and the remaining purge gas combine outside of passage 12 in the combustion zone 2 where they become the fuel or the oxidant, as the case may be, for a combustion reaction which generates heat and furnace gases. Thus, plugging or fouling of nozzle 22 is prevented despite a small nozzle diameter even if the furnace atmosphere contains high levels of particulates and/or condensable vapors, such as might be present in an enamel frit melting vessel. Other applications where the invention may find particularly advantageous use include the injection of gases into various high temperature smelting processes, and in waste incineration.

The purge gas simultaneously provides a cooling effect in addition to a physical gas barrier. Thus, water cooling of the gas injection means is not required while still avoiding damage to the gas injection nozzle which might be caused by the high temperatures within the combustion zone.

From the construction shown in FIG. 1, the following equations may be derived:

$$\frac{Q_E}{Q_J} = 0.26 \frac{(V_J - V_E)}{V_J} \frac{L}{d_{ID}} \quad \text{Equation (1)}$$

where:
Q$_J$= main gas jet volume flow rate;
Q$_E$=purge gas volume flow rate;
V$_J$=Q$_J$/A$_J$ main gas jet velocity;
V$_E$=Q$_E$/A$_E$ purge gas velocity;

$$A_J = \frac{\pi^2}{4^{ID}}$$

area of main gas jet at exit end 24 of nozzle 22
A$_E$=π/4 (D$^2$-d$^2_{OD}$) annular area of purge gas passage 35;
L=nozzle 22 recess;
D=port exit diameter;
d$_{ID}$=nozzle 22 inner diameter; and
d$_{OD}$=nozzle 22 outer diameter.

Equation (1) is formulated by jet theory and experimentation.

$$Q_E + Q_J = Q_T \quad \text{Equation (2)}$$

where:
Q$_T$=total gas flow.
Equation (2) is derived from the conservation of mass.

$$V_{MA} = \frac{M_E V_E + M_J V_J}{M_E + M_J} \quad \text{Equation (3)}$$

where:
V$_{MA}$=momentum-averaged velocity;
M$_J$=p$_J$Q$_J$A$_J$ main gas jet mass flow rate;
M$_E$=P$_E$Q$_E$A$_E$ purge gas mass flow rate; and
P$_J$=P$_E$=P gas density.

Equation (3) is derived from the conservation of momentum.

When designing for a particular installation, there are three unknown quantities: Q$_E$, Q$_J$, and V$_{MA}$. These three quantities are solved by using Equations (1), (2) and (3) in an iterative process.

Table 1 gives three examples of an oxygen lance installation with oxygen gas purge in accordance with the invention. The examples show the effect of nozzle recess, L, on the required purge gas flow rate, Q$_E$.

TABLE 1

| Variables | Example 1 | Example 2 | Example 3 |
|---|---|---|---|
| Q$_t$ | 6000 scfh | 6000 scfh | 3340.3 scfh |
| D | 1.5 inches | 1.5 inches | 1.5 inches |
| d$_{OD}$ | 0.675 inches | 0.675 inches | 0.675 inches |
| L | 2 inches | 4 inches | 4 inches |
| d$_{ID}$ | 0.423 inches | 0.423 inches | 0.340 inches |
| V$_{MA}$ | 435.6 ft/s | 268.1 ft/s | 135.9 ft/s |
| Q$_E$ | 3136.1 scfh | 3982.9 scfh | 2560.4 scfh |
| Q$_J$ | 2863.9 scfh | 2017.1 scfh | 779.9 scfh |

As can be seen from Example 1, the purge gas flow Q$_E$ is 52% of the total flow Q$_T$ for a 2 inch nozzle recess L. In Example 2, the purge gas flow is 66% of the total Q$_T$ for a 4 inch nozzle recess L. In Example 3, the flow was 77% of the total for a 4 inch nozzle. In Example 3, the momentum-averaged velocity is lower than optimum for low NO$_x$ emissions because the recess L is too deep for the total Q$_T$ available. Despite the situation being lower than optimum for low NO$_x$ emissions, the NO$_x$ emissions is still lower by a factor of about 7 compared to conventional oxy-fuel combustion.

Figure 2:
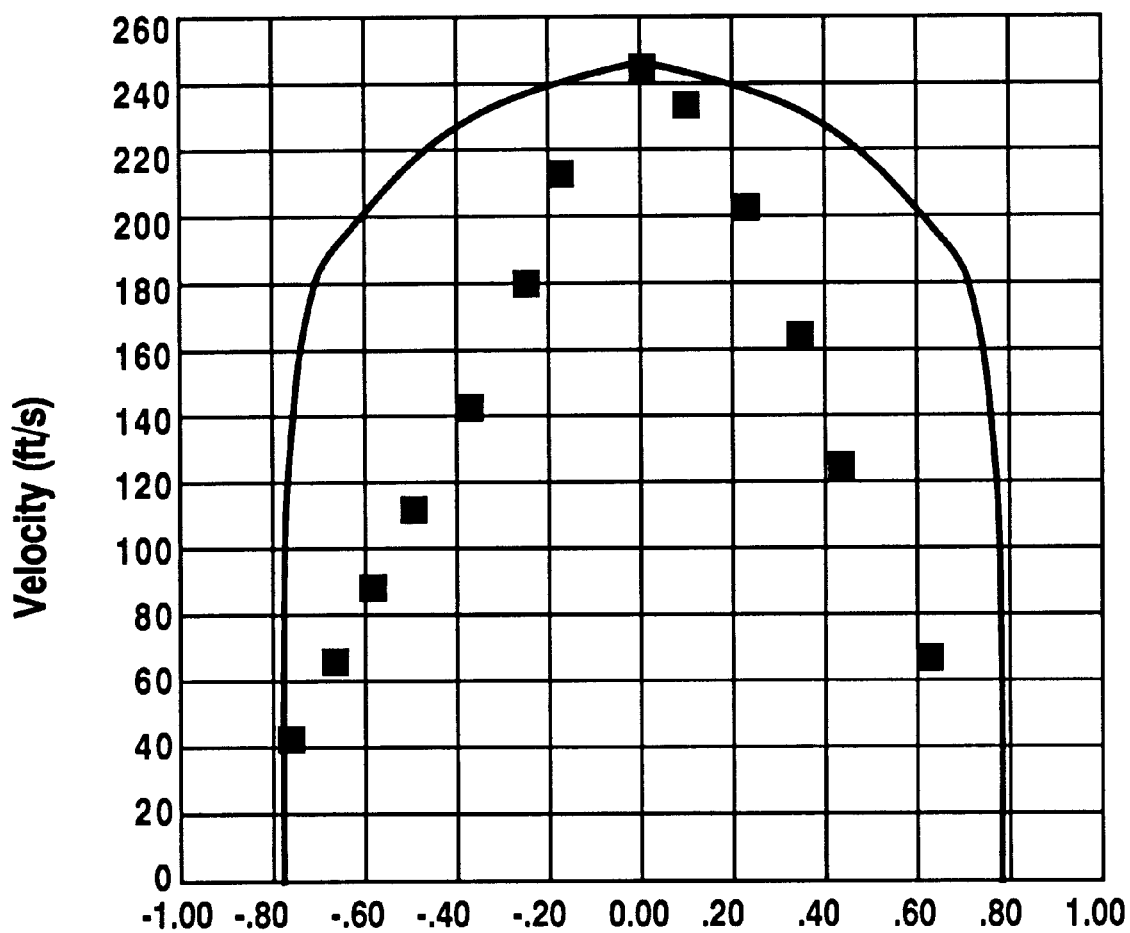
FIG. 2 is a profile of the purge gas velocity profile at the exit port of the passage into the furnace atmosphere.

FIG. 2 shows an example of the exit port 14 velocity profile with various data points from the radial center line of the nozzle exit for an application in which d$_{ID}$=0.397", d$_{OD}$=0.675", D=1.5", L=4", Q$_J$=1121 ft$^3$/hr and Q$_E$=3139 ft$^3$/hr. This differs from the typical flow profile of a conventional turbulent flow in a long pipe (calculated), shown as a solid line in FIG. 2. The low velocity gradient near the port exit 14 reduces the entrainment of the furnace gas around the port 14 and prevents corrosion as well as deposition of condensibles there. When a long refractory port is used as a nozzle, it creates a high velocity gradient near the port exit circumference and results in high entrainment of furnace gases at the port exit.

One advantage of the invention is that it provides two ways of keeping the refractory port wall temperature hot. First, it provides a larger port exit opening diameter for a given main gas jet momentum because of the velocity profile. This increases the furnace radiation into the port. Second, the lower gas velocity near the port wall reduces the cooling effect of the main gas.

Figure 3:
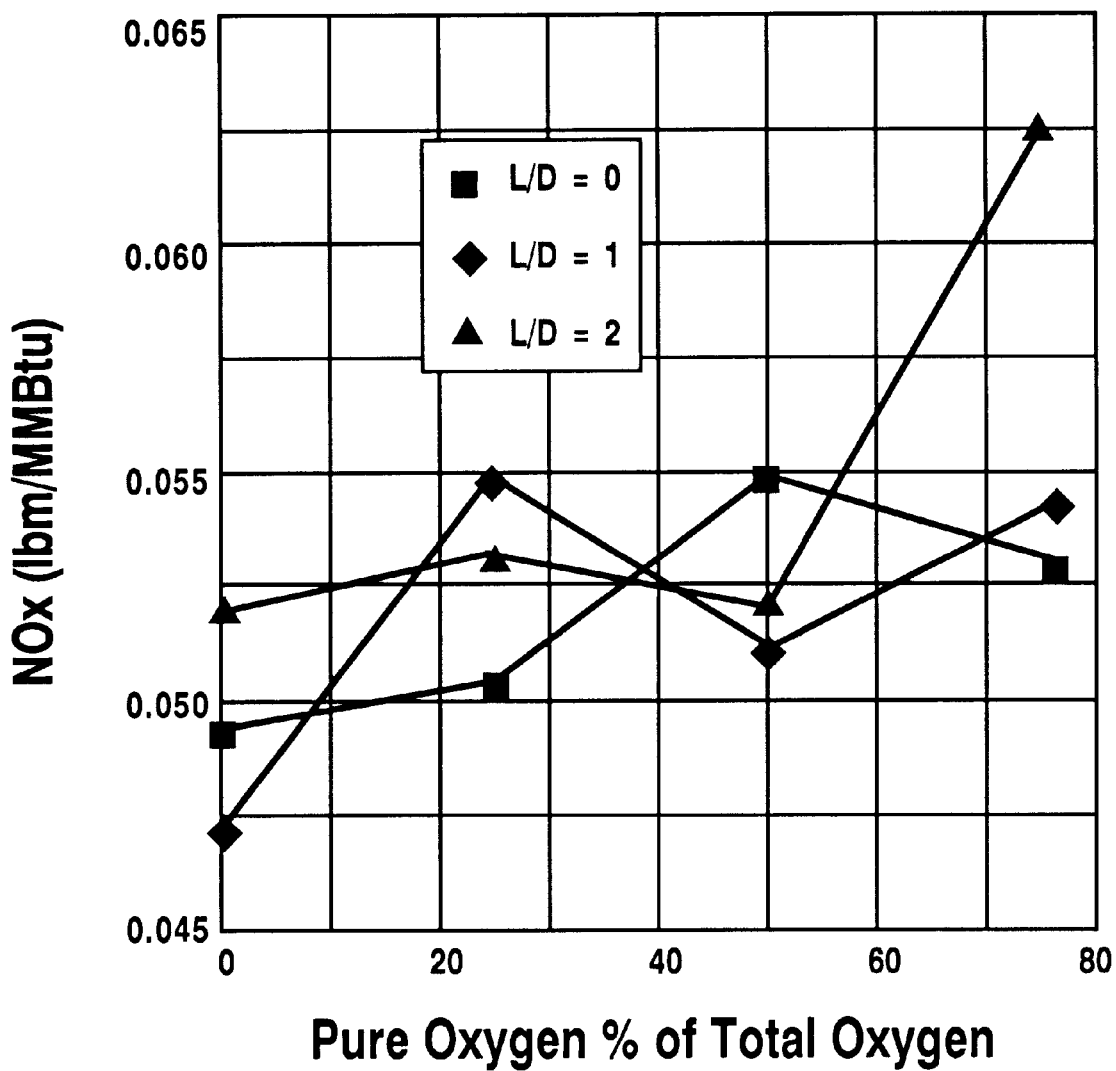
FIG. 3 is a graph that shows the $NO_x$ emissions for different configurations of the assembly at different percentages of entrained oxygen as a percentage of the total gas flow.
Figure 4:
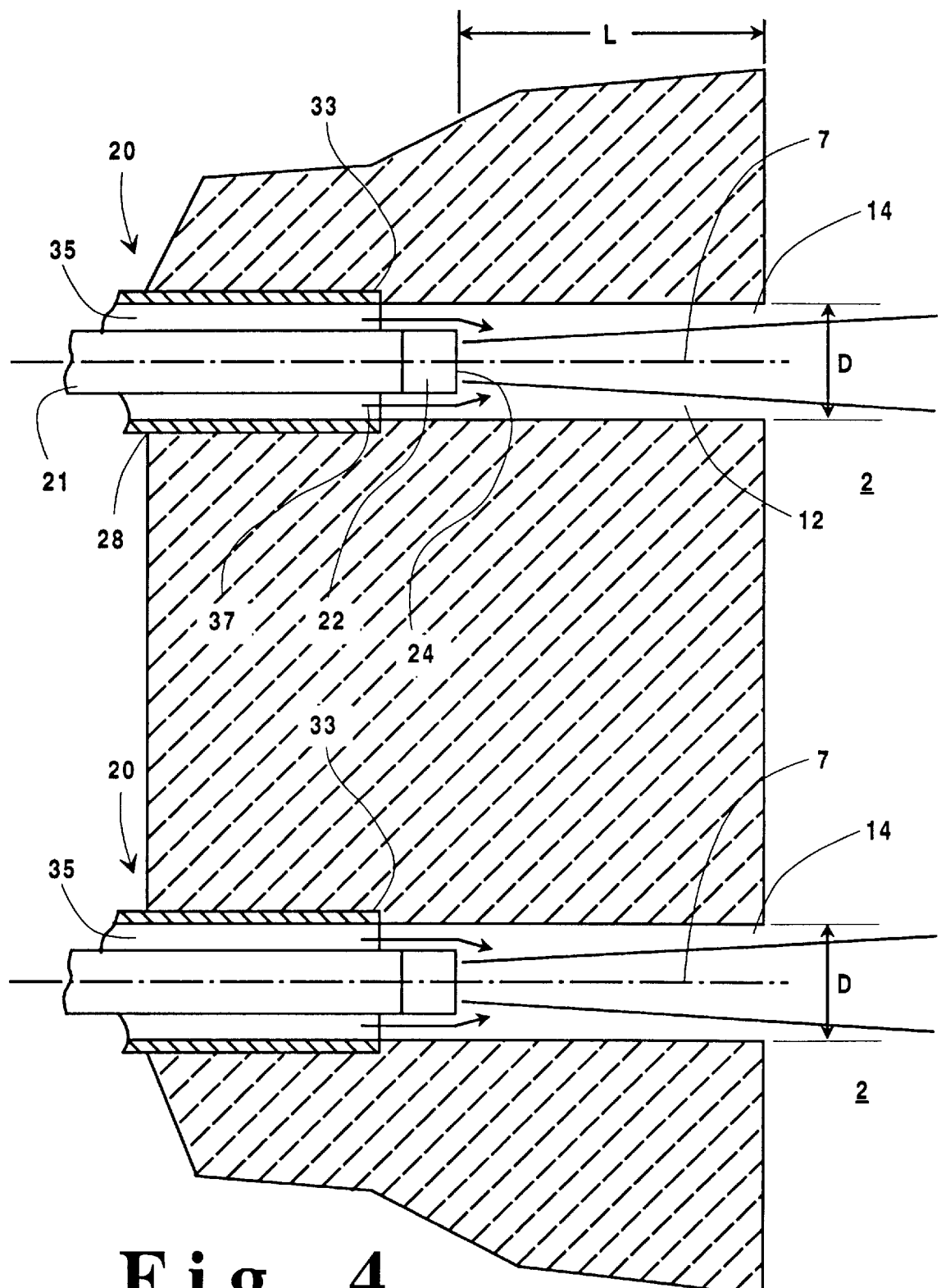
FIG. 4 is a schematic view of two of the recessed furnace lance purge gas system assemblies of FIG. 1.

FIG. 3 shows the low NO$_x$ emissions with O$_2$ being used as both the main gas and the purge gas with various ratios of L/D and percentage of oxygen purge gas as a percentage of the total main and purge gas. Low NO$_x$ emissions can be maintained for various conditions. At L/D=2 and at about 50% purge gas to total gas volume, NO$_x$ begins to increase. However, NO$_x$ emissions for these conditions are still lower, by up to a factor of 10, as compared to conventional oxy/fuel combustion.

Preferably, the high velocity gas injection system of the invention is employed to separately inject both fuel and oxidant into the combustion zone wherein they mix and combust. Most preferably, the fuel and oxidant are injected into the combustion zone each through a plurality of the high velocity gas injection units of this invention. Generally from 1 to 8 high velocity gas injection units may be employed in a single combustion system. A furnace or other such combustion facility may employ such combustion unit(s).

Several alternatives can be used in practicing the invention.

The purge gas velocity can be increased by decreasing the diameter D of exit port 14. This increases the purge gas momentum-averaged velocity. The limits are the lance pipe 10 outer diameter and excessive cooling of the exit port 14, which would yield undesirable condensates from the furnace gases.

If the lance and nozzle are formed of ceramic parts instead of metal, the lance nozzle recess distance L can be reduced since ceramics can tolerate higher operating temperatures and the momentum-averaged velocity of the purge gas can be higher.

The oxygen lance can be designed with an adjustable orifice shutter on the operator end of the lance. The operator can dial in the required entrained gas flow percentage based on the desired operation. That is, the flow can be determined by using Equations (1), (2) and (3).

The lance can be used with preheated oxygen with temperatures up to 1500° F. or with preheated fuel with temperatures up to 1200° F.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A unit for injecting a main gas into a furnace combustion zone through a passage in a wall of the furnace having an exit port opining with a diameter D communicating with the combustion zone, the unit comprising:

a nozzle in said passage positioned at a recess distance L from the exit port opening for injection of high velocity main gas into the passage toward the exit port opening; and means for providing purge gas, said purge gas having a composition substantially the same as that of the high velocity main gas, into the passage at a point further recessed from the exit port opening than is the nozzle for flow of purge gas around and past the nozzle to prevent furnace gases from entering said passage and attacking the nozzle wherein the purge gas volume is greater than 50% of the total of the main gas and purge gas and the purge gas has a velocity greater than 100 ft/sec.

2. The unit as in claim 1 wherein L/D is within the range of from 0.5 to 3.0.

3. The unit as in claim 1 further comprising a conduit for supplying the main gas to said nozzle and wherein the means for providing purge gas comprises a conduit coaxial with the main gas conduit and having an exit terminating upstream of the nozzle.

4. A method for injecting gas into a furnace zone comprising:

(A) passing main gas at a high velocity into a passage having an exit port opening which communicates with the furnace zone, said main gas being passed into the passage through a nozzle positioned at a recess from the opening;

(B) passing purge gas, said purge gas having a composition substantially the same as that of the main gas, into the passage at a point further recessed from the opening than where the main gas is passed into the passage, at a velocity exceeding 100 feet per second and at a flowrate such that the volume of purge gas passed into the passage is greater than 50 percent of the total volume of the main gas and purge gas passed into the passage; and (C) passing the main gas and the purge gas from the passage through the exit port opening into the furnace zone.

5. The method of claim 4 wherein the main gas comprises oxidant.

6. The method of claim 4 wherein the main gas and the purge gas are passed through the exit port opening into the furnace zone at a flowrate which does not cause cooling of the exit port.

7. The method of claim 4 wherein the main gas and the purge gas are passed through the exit port opening into the furnace zone at a flowrate which does not cause accumulation of condensible material at the exit port.

8. A method for combusting fuel and oxidant in a combustion zone comprising:

(A) passing main oxidant at a high velocity into a first passage having an exit port opening which communicates with the combustion zone, said main oxidant being passed into the first passage through a nozzle positioned at a recess from said first passage opening, and passing purge oxidant into the first passage at a point further recessed from said first passage opening than where the main oxidant is passed into the first passage, at a velocity exceeding 100 feet per second and at a flowrate such that the volume of purge oxidant passed into the first passage is greater than 50 percent of the total volume of the main oxidant and purge oxidant passed into the first passage;

(B) passing main fuel at a high velocity into a second passage having an exit port opening which communicates with the combustion zone, said main fuel passed into the second passage through a nozzle positioned at a recess from the opening and passing purge fuel into the second passage at a point further recessed from said second passage opening than where the main fuel is passed into the second passage, at a velocity exceeding 100 feet per second and at a flowrate such that the volume of purge fuel passed into the second passage is greater than 50 percent of the total volume of the main fuel and purge fuel passed into the second passage;

(C) passing the main oxidant and the purge oxidant from the first passage through the first passage exit port opening into the combustion zone, and passing the main fuel and the purge fuel from the second passage through the second passage exit port opening into the combustion zone; and (D) mixing the main oxidant and the purge oxidant with the main fuel and the purge fuel in the combustion zone and combusting them therein.

9. A method for injecting gas into a furnace zone comprising:

(A) passing main gas comprising fuel at a high velocity into a passage having an exit port opening which communicates with the furnace zone, said main gas being passed into the passage through a nozzle positioned at a recess from the opening;

(B) passing purge gas, said purge gas having a composition substantially the same as that of the main gas, into the passage at a point further recessed from the opening than where the main gas is passed into the passage, at a velocity exceeding 100 feet per second and at a flowrate such that the volume of purge gas passed into the passage is greater than 50 percent of the total volume of the main gas and purge gas passed into the passage; and (C) passing the main gas and the purge gas from the passage through the exit port opening into the furnace zone.

* * * * *